H. L. INGERSOLL.
BOOSTER MOTOR FOR LOCOMOTIVES.
APPLICATION FILED JUNE 6, 1919.

1,383,633.

Patented July 5, 1921.
4 SHEETS—SHEET 1.

Inventor
Howard L. Ingersoll
By F. R. Cornwall Atty.

UNITED STATES PATENT OFFICE.

HOWARD L. INGERSOLL, OF WHITE PLAINS, NEW YORK.

BOOSTER-MOTOR FOR LOCOMOTIVES.

1,383,633.  Specification of Letters Patent.  Patented July 5, 1921.

Application filed June 6, 1919. Serial No. 302,321.

*To all whom it may concern:*

Be it known that I, HOWARD L. INGERSOLL, a citizen of the United States, residing at White Plains, in the county of Westchester and State of New York, have invented a certain new and useful Improvement in Booster-Motors for Locomotives, of which the following is a full, clear, and exact description, such as will enable others skilled in the art to which it appertains to make and use the same, reference being had to the accompanying drawings, forming part of this specification, in which,—

Fig. 6 is a longitudinal sectional view through the booster motor showing the clutch mechanism, and, Fig. 7 is a diagrammatic view of the valve reversing mechanism for the booster motor.

This invention relates to a new and useful improvement in booster motors for locomotives relating particularly to the controlling means therefor, the same being an improvement upon the controlling means disclosed in a companion application filed by me on May 22, 1919, serially numbered 299,037, Patent No. 1,339,395, granted May 11, 1920.

It is the object of the present invention to insure the sequential operation of the clutch mechanism of the booster motor and the opening of the throttle valve to admit steam thereto. This object is attained by the clutch controlling means which blocks off the air pressure from the pilot valve for actuating the throttle until the clutch is in its full operative position, *i. e.*, the gears are in mesh and the booster motor entrained to drive its axle. When this operation is accomplished, the air pressure is admitted to the pilot valve in readiness to operate said valve when the throttle of the main locomotive is operated to admit steam through the dry steam pipe to the main cylinders, the pressure in said dry steam pipe will operate said pilot valve to open connection to the pressure means which operates a throttle valve controlling the steam pressure to the booster motor.

In the drawings, 1 indicates the shell of a locomotive boiler and 2 the steam dome thereof, 3 is the dry steam pipe leading from the steam dome down to the main cylinders 4 of the locomotive. I have conventionally shown the throttle valve 81 which controls the upper end of this dry steam pipe 3, said valve being operated by a rod 82 connected to a throttle lever 83 located in the cab of the locomotive, which lever is operable by the engineer at will.

5 are the main driving wheels of the locomotive, 6 the pilot truck wheels and 7 the trailer truck wheels, the latter being mounted in journal boxes guided by pedestal jaws in the side frame pieces of a trailer truck frame 8.

Figure 5:
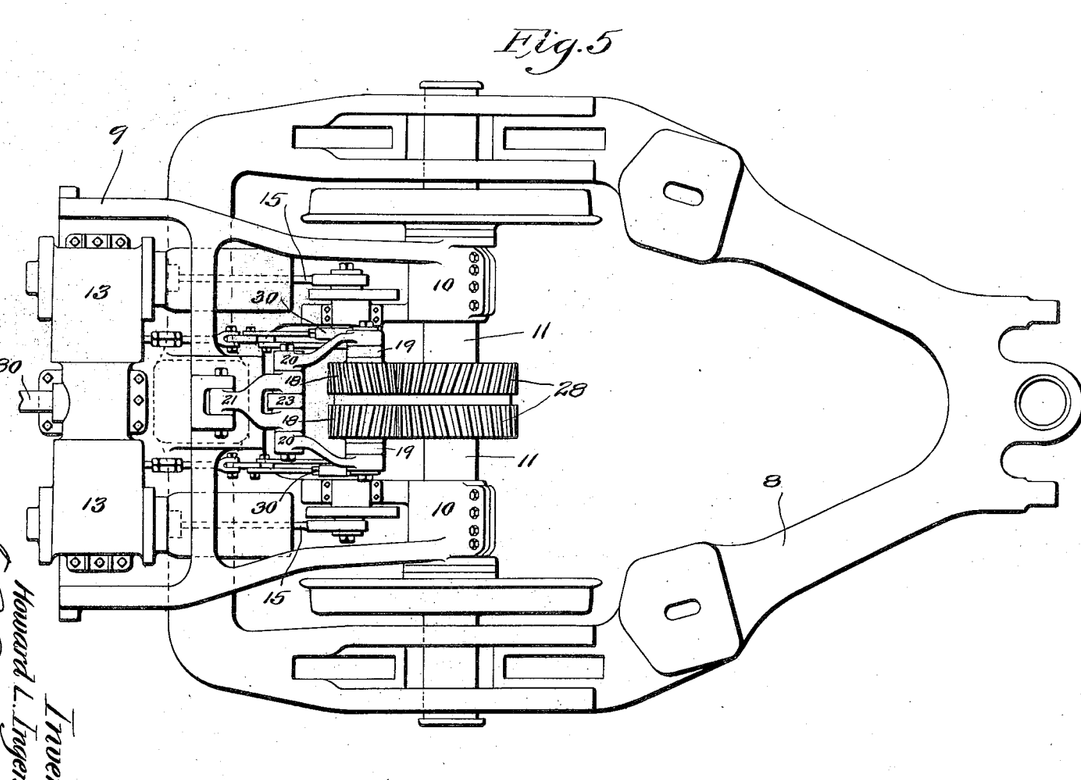
Fig. 5 is a plan view of the booster motor as applied to the trailer truck of a locomotive.

9 indicates a bed-plate for the booster motor, preferably in the form of a casting, whose forward end is provided with bearings 10, spread apart as shown in Fig. 5, to embrace the axle 11 on which the trailer truck wheels are mounted.

The booster motor *per se* preferably consists of a pair of cylinders 13 in which are arranged pistons connected to cross-heads and operating pitmen 15 which are connected to a crank shaft mounted in bearings on the bed-plate, as disclosed in my companion application. This crank shaft (which is marked 16) carries twin skew gears 17 in mesh with corresponding gears 18, the latter being mounted on rock arms 19 pivotally arranged on the crank shaft 16.

20 and 21 are the members of a toggle mechanism connected to the upper ends of the arms 19 and to the bed plate; pintle bolt 22 forms a hinge connection between the links of the toggle, while an eye 23 pivotally connected to said pintle bolt, is attached to a piston rod 24, having a piston 25 arranged at its lower end operating in a cylinder 26. A spring 27 arranged above the piston tends at all times to depress the piston rod and break the toggle, moving it to the position shown in dotted lines in Fig. 6, wherein the gear 18 is thrown out of mesh with a gear 28 arranged on the trailer truck axle 11. A pipe leading from a source of air pressure supply, to be hereinafter described, admits pressure under the piston 25 to raise it and move the gear 18 into mesh with the gear 28. When this pressure is exhausted, the spring 27 disentrains the gears.

Figures 6, 7:
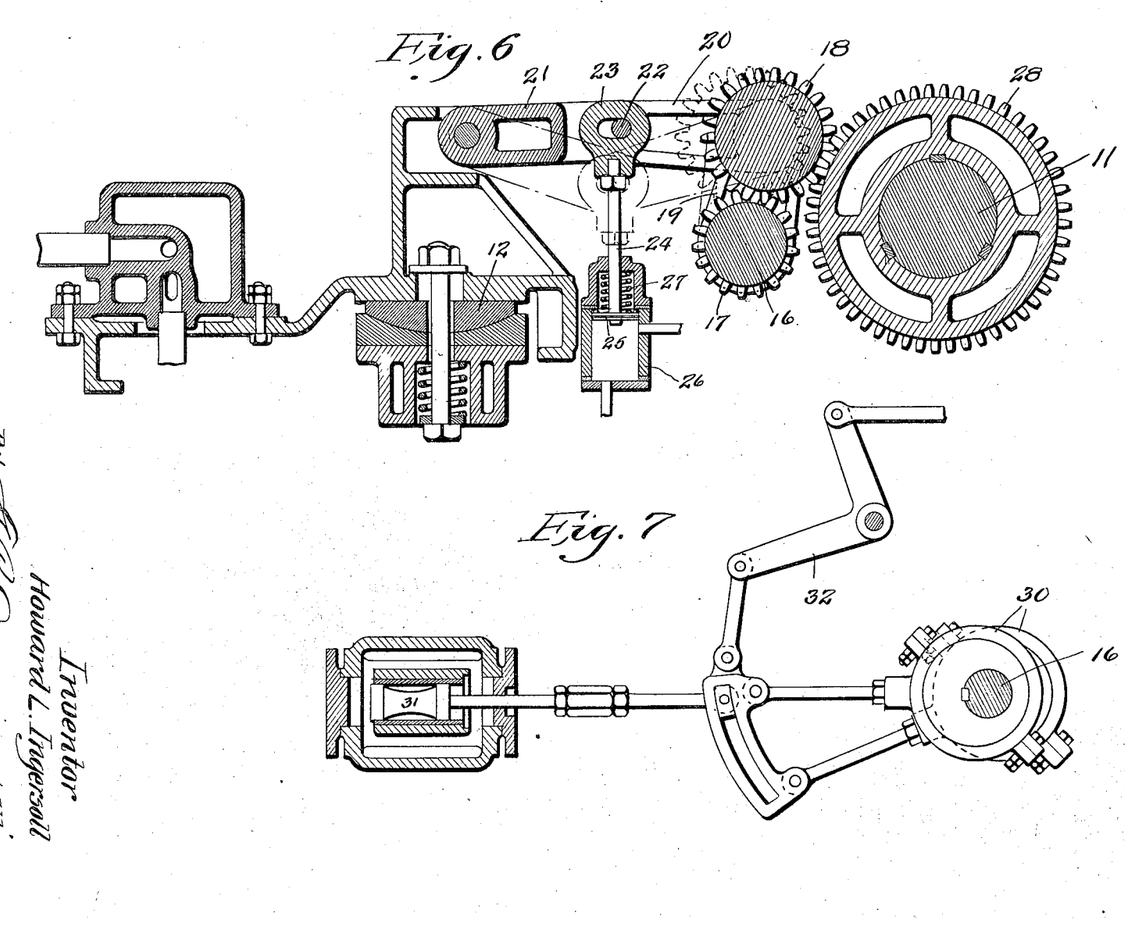

In Fig. 7, I have shown a reversing valve mechanism for the cylinders 13, the same being in the form of eccentrics 30 mounted on the crank shaft 16 and connected by suitable links to appropriately operate valves 31 arranged in the steam chest to drive the booster motor, depending upon the direction in which the main locomotive is intended to be driven.

Figure 4:
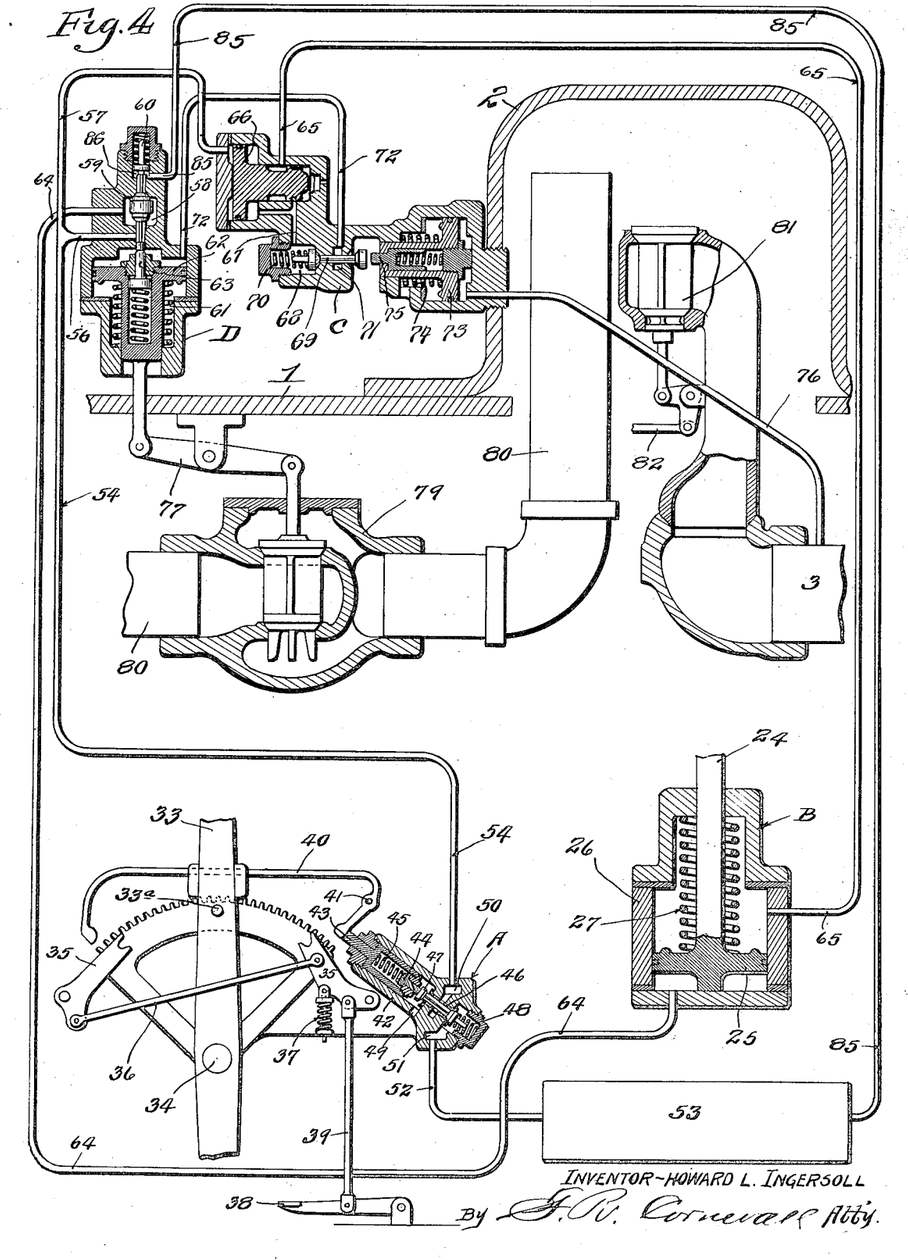
Fig. 4 is a diagrammatic view of the booster motor controlling system.

Referring now to Fig. 4, 33 indicates the reverse lever of the locomotive pivoted at 34 and having a dog (not shown) which coöperates with the teeth on the upper edge of the segment. This reverse lever operates in the usual way to position the valve mechanism for the main cylinders of the locomotive. When the reverse lever is thrown forward, or into the "corner" (as it is colloquially expressed), it will position the valve mechanism so that the same will be given the full stroke and the main cylinders of the locomotive receive steam throughout substantially their full stroke. This is the usual practice in starting locomotives. When the reverse lever is pulled rearwardly from its central position, the valve mechanism is so positioned that the locomotive will be driven backwardly. After the reverse lever is positioned forwardly or backwardly, as the case may be, then the throttle valve, the lever of which is not shown, but which is, of course, present in all locomotives, is operated to admit steam to the main cylinders through the dry steam pipe 3. In order to control the throw of the reverse lever, I provide the same with a pin or projection 33ª in the path of which are arranged two oppositely disposed dogs 35. These dogs will arrest the reverse lever just one notch short of its full stroke in either direction and normally prevent its operating the booster motor controlling valve. To make the reverse lever double acting, I connect the dogs 35 by means of a rod 36 arranged on opposite sides of the pivotal points of said dogs. A spring 37 tends to hold the dogs in position, and a foot lever 38 connected by a rod 39 to one of the dogs can be operated so as to simultaneously depress both dogs out of the path of travel of the pin 33ª at the will of the engineer, and thus enable the reverse lever to move its full stroke and operate the booster motor controlling valve.

40 indicates an overhanging extension in the form of a lever pivoted at 41, having projections lying in the path of movement of the reverse lever so that when said reverse lever is moved to its extreme position in either direction, said lever 40 will be rocked to operate the booster motor controlling valve.

The details of construction of this booster motor controlling valve are best seen in Fig. 4, wherein the letter "A" indicates the valve in its entirety, which will be seen to consist of a casing 42 having a plunger 43 slidingly arranged therein, which plunger carries a movable head 44 in its inner end normally held in position by a spring 45 arranged within the plunger 43. 46 is a bushing forming a mount for a double-headed valve 47 designed to alternately coöperate with seats at opposite ends of the bushing 46. A spring 48 tends to normally hold valve 47 in position to close the outer seat, and in this position of the valve the inner head of the valve is unseated and an exhaust port 49 thereby opened to a chamber 50. 51 is the pressure chamber of the valve which is connected by means of a pipe 52 to an air-pressure reservoir 53. Thus, it may be said that pressure is constantly in the chamber 51, and that the chamber 51 is normally blocked or stopped by the outer head of the valve 47 being seated home.

When, however, the foot treadle 38 is depressed and the reverse lever 33 moved to either of its extreme positions, the plunger 43 will be moved inwardly to unseat the outer head of the valve 47 and move the inner head of said valve 47 to its seat, thus establishing communication between the pressure chamber 51 and the chamber 50 and the exhaust port 49 is now closed.

We will assume for the purposes of this description that the locomotive is at a standstill and that the reverse lever has been thrown to either of its extreme positions so as to operate the valve 47 thus closing the exhaust 49 and establishing communication between the chambers 51 and 50, as above described.

54 indicates a pipe leading from chamber 50, said pipe being divided into two branches, one, 56, leading to a valve which may be generally designated as "D" and the other, 57, to a valve which may be generally designated as "C".

Figure 1:
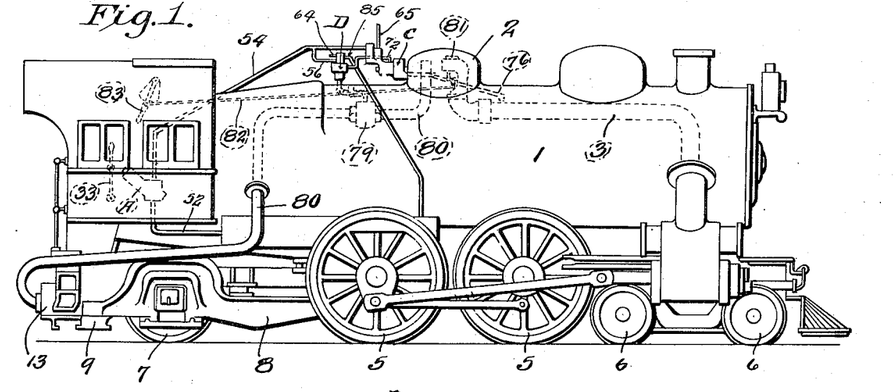
Figure 1 is a conventional illustration of a locomotive equipped with my improved booster motor.
Figures 2, 3:
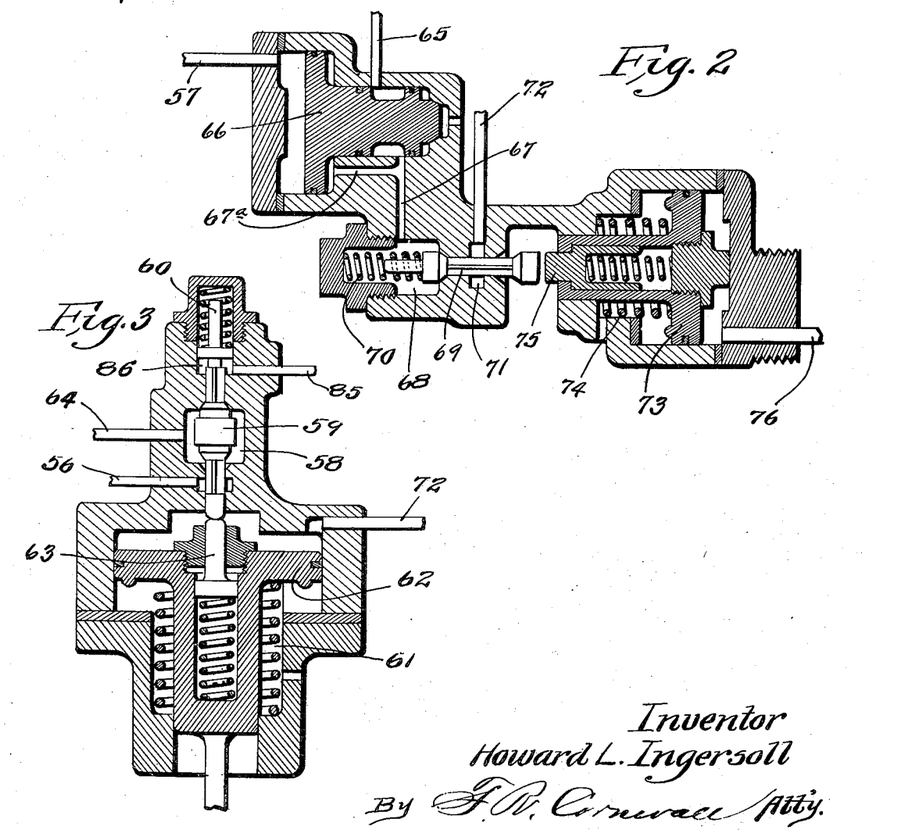
Fig. 2 is a detail view of one of the valves used in the booster motor control system.
Fig. 3 is a detail view of another one of the valves used in said system.

Referring now to Fig. 3, which illustrates the details of valve "D", it will be observed that there is a valve chamber 58 containing two connected valves 59 having cruciform stems and designed to be seated, respectively, in the seats in opposite sides of the chamber 58. There is a spring-pressed plunger 60 arranged in the upper portion of the valve casing which tends to unseat the upper valve and seat the lower valve. This spring-pressed plunger is opposed by a stronger spring 61 bearing against the underside of a piston 62 having a spring pressed plunger 63 which engages with the underside of the double valve 59 and normally holds the lower one of said valves from its seat so that communication is normally established between pipe 56 and chamber 58. The purpose of providing a spring-pressed plunger 63 is to enable the piston 62 to have a slightly greater stroke than the movement of the double valve 59 so that the upper one of the valves will be held yieldingly to its seat.

Leading from the chamber 58 is a pipe 64 which admits pressure to the underside of the piston 25 to raise it and move the gear 18 into mesh with the gear 28. When this pressure is released the spring 27 distrains the gears, as before described. After the gears are entrained by the upward movement of piston 25, a port communicating with pipe 65 is opened so that pressure is permitted to pass through pipe 65 to the valve mechanism generally designated as "C". When the pressure is initially admitted into pipe 54 before described, it passes into the two branches 56 and 57 referred to, the control of pressure from the pipe 56 having just been described. The pressure from pipe 57 operates to move a valve 66 to establish communication between the port communicating with the pipe 65 and a port 67 in the valve casing. There is a branch port 67ᵃ leading to the inner end of the chamber in which the head of valve 66 operates, but due to the preponderating pressure on the outer face of the head of the valve, said valve will be moved toward the right, as shown in the drawings, to establish communication between pipe 65 and port 67 as above described. Pressure from port 67 enters a chamber 68 in which is located one head of a double headed valve 69. This double headed valve has its outer head normally held to its seat by means of a spring 70, hence, no pressure in chamber 68 can pass beyond the valve while the same is thus seated.

71 indicates a chamber in the valve casing with which communicates a pipe 72 leading to the upper end of the cylinder controlling the throttle operating mechanism, and which chamber, through the pipe 72, is normally exhausted and has communication between chamber 71 and the atmosphere. 73 is a piston normally held retracted by means of a spring 74, said piston carrying a spring pressed plunger 75 in line with the inner head of valve 69.

In the usual operation of locomotives, the reverse lever 33 is first operated to move the valve mechanism in a direction appropriate to drive the engine forwardly or backwardly, as desired, and when this is done the engineer, by placing his foot on the foot lever, will disable the blocking dogs and permit the reverse lever to engage the plunger in the valve mechanism "A" and admit air pressure into the booster motor controlling system. This pressure, as above described, will be under dual control: first by the piston 25 in the clutch operating mechanism, which is generally designated as valve "B", and which must be operated before the pressure is admitted to the pilot valve "C". The pressure in pilot valve "C" is blocked until such time as the throttle of the main driving mechanism of the locomotive is opened to admit steam through the dry steam pipe 3 to the main cylinders of the locomotive, at which time steam pressure from dry steam pipe 3 passes through a pipe 76 behind piston 73 and moves the same inwardly so as to cause the outer head of valve 69 to close the exhaust from chamber 71 and establish communication between said chamber 71 and chamber 68, whereby air pressure in chamber 68 will pass into the chamber 71 and through pipe 72 to the chamber above the piston 62 forcing the latter downwardly and operating a lever 77 to which it is connected, thereby raising the throttle valve 79 located in the booster motor steam supply pipe 80. The above operative conditions of the booster motor controlling system exist for such period of time as it is desired that the booster motor shall maintain driving relation to its driven axle. In ordinary service conditions, it is preferable to operate the booster motor in connection with the main driving mechanism of the locomotive from a starting position to such time as the main locomotive attains a speed of about twelve miles an hour, when a governing mechanism (not herein shown or described, and which forms no part of the present invention) is brought into play to automatically shut off the steam supply from the booster motor.

Another means of cutting off the steam supply from the booster motor is when the reverse lever is "hooked up", i. e., retrieved a notch or two to shorten the stroke of the valves which control the steam supply to the main cylinders of the locomotive. When the reverse lever is thus "hooked up", the plunger in valve mechanism "A" is released and the air pressure cut off from the pipe 54. Valve mechanism "A" also, when its plunger is released, opens an exhaust through chamber 50 and the pressure in pipe 54 and its branches 56 and 57 is now exhausted. The first effect of this exhaust is to permit the piston 66 to be moved by pressure through pipe 65 and ports 67, 67ᵃ over to close the port 67 and shut off pressure above the throttle operating cylinder 62, which, rising, will force the pressure above it back through pipe 72, chamber 71, ports 67 and 67ᵃ, to hold the valve 66 in its exhausting position. The double headed valve 69 during this operation is held by the piston 73 so that its inner head closes the exhaust from chamber 71, but maintains communication between chambers 71 and 68.

When the piston 62 rises, it will come in contact with the lower solid end of valve 59 raising it so as to open communication between the chamber below the piston 25, through pipe 64, chamber 58 and pipe 56 to the exhaust chamber in valve "A." Spring 27 will force piston 25 downwardly releasing the clutch and shutting off pipe 65.

In order to utilize direct pressure from the reservoir in sustaining the piston 25 in its raised position, I provide a pipe 85 extending from the main reservoir to a chamber 86 located above the upper head of valve 59 so that when piston 62 is in its lower position and the upper head of valve 59 is unseated, the pressure from pipe 85 will pass through chamber 58 and pipe 64 to the chamber under the piston 25. This direct connection is, of course, closed when the valve 59 is raised, as shown by full lines in Fig. 3.

Summary of operation: To start the locomotive in the forward direction the engineer moves the reverse lever 33 to the extreme forward position (to the right Fig. 4) pressing down treadle 38 with his foot to allow the reverse lever to actuate valve device A. He then opens the main throttle valve of the locomotive as usual and the booster is entrained with the axle it is designed to drive and is supplied with steam. This results from the following movements of the parts constituting the booster control mechanism: Valve 46 of the device A is moved by the reverse lever to put pipe 52 in communication with pipe 54. The compressed air in pipe 54 passes through branch 56 and into pipe 64 (valve 59 being raised by piston 62) and through the pipe into the cylinder 26 of the booster entraining motor B, the piston 25 of which is raised to mesh idler gear 18 with the gear 28 on the locomotive axle (Fig. 6). At the same time as air is passing to the entraining motor, as just described, it also flows from pipe 54 through branch pipe 57 to the booster throttle controller C and moves piston 66 from the position shown in Fig. 4 to that shown in Fig. 2. The controller, however, cannot act to supply the booster throttle valve motor with air until (1) the entrainment of the booster is completed, and (2) the main driving means of the locomotive is under steam. When piston 25 of the entraining motor B uncovers the inlet of pipe 65 air will pass to the controller C and through port 67 thereof to chamber 68, piston valve 66 having been moved to put pipe 65 in communication with port 67. The air is blocked in chamber 68 by valve 69 but this valve is moved to put chamber 68 in communication with pipe 72. As soon as steam is admitted to dry pipe 3 by the opening of the main throttle 81, the steam from the dry pipe 3 passing through pipe 76 and moving piston 73 against valve 69, air will pass through pipe 72 to the booster throttle motor D and the booster will be supplied with steam. It will have been observed that when motor D is operated valve 59 being no longer supported by piston 62, will move downwardly shutting off the air from pipe 56. This movement of the valve, however, puts pipe 85 leading from tank 53 in communication with pipe 64 so that the position of the fluid pressure operated parts of the control mechanism remains unchanged.

The booster is put out of operation either (1) when the engineer hooks up his reverse lever to shorten valve movement of the main engine (which under ordinary conditions he will do when the locomotive attains a speed of about ten or twelve miles an hour); or (2) when he closes the main throttle. In the first case, the operation of the booster control mechanism is such that steam is first cut off from the booster and thereafter the booster is disentrained from its axle. In other words, the starting sequence is reversed. In the second case steam is cut off from the booster but the booster is not disentrained from the axle. Assume, now, that the reverse lever is hooked up. Valve 46 will return to the position shown in Fig. 4, cutting off pipe 54 from pipe 52. Air pressure against piston 66 will exhaust through port 49 of the device A and pressure from pipe 65 against the other side of the piston (through port 67ª) will move the piston to the left (Figs. 2 and 4) cutting off the air through pipe 72 to the throttle motor D. When valve 46 is in this position it provides a vent to the atmosphere for the pressure in motor D and pipe 72. Steam is now cut off from the booster but until this happens the booster remains entrained with the locomotive axle because the entraining motor is under pressure from the air line 85, 64. As soon, however, as the booster throttle motor piston rises to lift valve 59 the air line is cut between pipe 85 and 64 and an exhaust for motor D is provided through pipes 64, 56, 54 and port 49 of the device A.

If however the engineer closes his main throttle without hooking up the reverse lever, the steam is cut off from the booster but no disentrainment of the booster takes place unless the reverse lever is also hooked up. When main throttle 81 is closed the pressure in dry pipe 3 will be reduced, piston 73 will move to the right and valve 69 will block the air pressure from pipe 65 to pipe 72 and the motor D will exhaust past valve 69. As a consequence of the upward movement of piston 62 valve 59 is raised, cutting air line 85, 64, but as air may now pass from pipes 54 and 56 into chamber 58 and pipe 64 piston 25 will remain in its elevated position so that the booster will not be disentrained from the axle 11. Under these conditions it is unnecessary to disengage the driving connection between the booster and locomotive.

What I claim is:

1. In controlling apparatus for a locomotive booster motor, the combination of mechanism for operatively connecting the booster motor with the locomotive, mechanism for setting said booster motor in operation, and means whereby the aforesaid two mechanisms are operable only in sequence.

2. In a controlling mechanism for booster motors for locomotives, the combination of a controlling mechanism, a booster motor, means for supplying energy thereto, a clutch and means operated by said controlling mechanism for insuring sequential control of said clutch and said energy.

3. In combination with a booster motor for locomotives, a controlling mechanism therefor, means for supplying energy to the booster motor, and means operated by said controlling mechanism for first insuring the movement of the clutch into position and then supplying energy to said motor when the locomotive is starting or running at a low speed.

4. In combination with a controlling mechanism for locomotives, a booster motor, means for supplying energy thereto, a clutch, means operated by said controlling mechanism of the main locomotive for first cutting off the energy from the motor and then disengaging said clutch.

5. The combination with the main driving means of a locomotive and its controlling devices, of a booster motor and mechanism for operatively connecting the booster motor with the locomotive, mechanism for setting the booster motor in operation, and means, the actuation of which is conditioned upon the position of the controlling devices of the main driving means whereby the aforesaid two mechanisms are operable only in sequence.

6. In a controlling mechanism for booster motors for locomotives, the combination of the controlling mechanism of the locomotive, including a moving part, a booster motor, a clutch and throttle valve for said booster motor, and means operated by said moving part for sequentially controlling said throttle valve and clutch.

7. In a controlling mechanism for booster motors for locomotives, the combination of the controlling mechanism of the locomotive, a booster motor, a steam supply therefor, an air pressure system in control of said booster motor, a clutch mechanism for entraining the booster motor with the axle to be driven, a pressure operated piston for controlling said clutch, means for initially admitting pressure to operate said piston, and means controlled by the piston for establishing direct connection between the source of air pressure supply to the chamber under the piston when the piston approaches the limit of its entraining movement.

8. In a controlling mechanism for booster motors for locomotives, the combination of the controlling mechanism of the locomotive, a booster motor, a steam supply therefor, an air pressure system in control of said booster motor including a clutch mechanism, a throttle valve, a pressure operated piston in said system for actuating said throttle valve, said piston also operating a valve for controlling the supply of pressure to the clutch mechanism.

9. In a controlling mechanism for booster motors for locomotives, the combination of the controlling mechanism of the locomotive, a booster motor, a steam supply therefor, an air pressure system in control of said booster motor, said system including a pressure operated clutch mechanism, a pressure operated throttle valve for controlling the steam supply to the booster motor, the operation of the latter controlling the movement of the former, a pilot valve in control of said throttle valve mechanism, and means operated from the steam supply to the main cylinders of the locomotive for operating said pilot valve.

10. In a controlling mechanism for booster motors for locomotives, the combination of the controlling mechanism of the locomotive, a booster motor, a steam supply therefor, an air pressure system in control of said booster motor, said system including a pressure operated piston for admitting and shutting off steam to the booster motor, a pilot valve in control of said piston for admitting pressure to one side thereof to open said throttle valve, and means for exhausting pressure from said pilot valve whereby the operating pressure of the throttle valve controlling piston is utilized to move said pilot valve to a position where it will exhaust the pressure from the throttle valve operating piston thereby permitting said throttle valve to close.

11. In combination with the main driving means of a locomotive and its controlling devices, a booster motor, means for entraining the booster motor with the locomotive, and means for setting the booster motor in operation which is incapable of actuation until the entraining of the booster with the locomotive has taken place.

12. In combination with the main driving means of a locomotive and its controlling devices, a booster motor, means for entraining the booster motor with the locomotive, and means for setting the booster motor in operation, the actuation of which is conditioned upon the main driving means being set in operation and upon the complete entrainment of the booster with the locomotive.

13. In combination with the main driving means of a locomotive and its throttle valve and reverse lever, a booster motor, means for entraining the booster motor with the locomotive, and means for setting the booster motor in operation, the actuation of which is conditioned upon said reverse lever being in full starting position, the throttle valve open, and said entraining means having completed the entrainment of the booster with the locomotive.

14. In a controlling mechanism for booster motors for locomotives, the combination of a booster motor, and means for initially entraining said booster motor so that it is in condition to become a driving factor, means for admitting energy to said booster motor, causing it to become an effective driving factor, and means for insuring the sequential operation of said means.

15. In combination with the main driving means of a locomotive, a booster motor to aid the main driving mechanism in starting the locomotive and for propelling the same at low speeds, mechanism for operatively connecting said booster motor with and disconnecting it from the locomotive, mechanism for supplying the booster motor with motive power, and controlling means for the aforesaid mechanisms whereby, when the booster is put into operation, it is first operatively connected with the locomotive and thereafter supplied with motive power and when it is put out of operation the motive power is first cut off from the motor and the motor thereafter disengaged from the locomotive.

16. In combination with the main driving means of a steam propelled locomotive, a steam actuated booster motor to aid the main driving means in starting the locomotive and propelling the same at low speeds, mechanism for operatively connecting the booster motor with and disconnecting it from the locomotive, mechanism for supplying the booster motor with steam, and controlling means for the aforesaid mechanisms whereby when the booster is put into operation, it is first operatively connected with the locomotive and thereafter supplied with steam and when it is put out of operation steam is cut off therefrom and the motor thereafter disconnected from the locomotive.

17. In combination with the main driving means of a steam propelled locomotive, a booster motor to aid the main driving means in starting the locomotive and propelling the same at low speeds, a train of gears for operatively connecting the booster motor with an axle of the locomotive, two of which gears are disengageable from each other, mechanism for meshing and disengaging said gears, mechanism for supplying the booster motor with motive power, and controlling means for the aforesaid mechanisms whereby, when the booster is put into operation, it is first entrained with the locomotive axle and thereafter supplied with motive power, and when it is put out of operation the motive power is first cut off therefrom and the motor thereafter disentrained from the locomotive axle.

18. In combination with the main driving means of a steam propelled locomotive, a booster motor to aid the main driving means in starting the locomotive and propelling the same at low speeds, a fluid pressure operated mechanism for operatively connecting said booster motor with and disconnecting it from the locomotive, a fluid pressure operated mechanism for supplying the booster motor with motive power, and controlling means for admitting and excluding fluid pressure to and from the aforesaid mechanisms whereby, when the booster is put into operation, it is first operatively connected with the locomotive and thereafter supplied with motive power, and when it is put out of operation the motive power is first cut off therefrom and the motor thereafter disengaged from the locomotive.

19. In combination with the main driving means of a steam propelled locomotive and its controlling devices, a booster motor to aid the main driving means in starting the locomotive and propelling the same at low speeds, mechanism for operatively connecting said booster motor with and disconnecting it from the locomotive, mechanism for supplying the booster motor with motive power, and controlling means for said mechanisms, the operation of which is dependent upon the position of the controlling devices of the main driving means of the locomotive and which is constructed so that when the booster is put into operation it is first operatively connected with the locomotive and thereafter supplied with motive power and when it is put out of operation the motive power is first cut off therefrom and the motor thereafter disconnected from the locomotive.

20. In combination with the main driving means of a steam propelled locomotive, a booster motor to aid the main driving means in starting the locomotive and propelling the same at low speeds, a fluid pressure device for controlling the operative engagement of the booster motor with the locomotive, a fluid pressure device for controlling the application of motive power to the booster motor which is actuated, in setting the booster motor in action, after the first mentioned device has completed its operation, whereby the power is not applied to the booster motor until it has been fully engaged with the locomotive.

21. In combination with the main driving means of a steam propelled locomotive, a booster motor to aid the main driving means in starting the locomotive and propelling the same at low speeds, a fluid pressure device for controlling the operative engagement of the booster motor with the locomotive, a fluid pressure device for controlling the application of motive power to the booster motor, said last named fluid device being actuated and its operation completed, when the booster motor is to be put out of action before the first named fluid pressure device is actuated.

22. In combination with the main driving means of a steam propelled locomotive, a booster motor to aid the main driving means in starting the locomotive and propelling the same at low speeds, a device for controlling the operative engagement of the booster motor with the locomotive, a device for controlling the application of motive power to the booster motor which is actuated, in setting the booster motor in action after the first mentioned device has completed its operation, whereby the power is not applied to the booster motor until it has been fully engaged with the locomotive.

23. In combination with the main driving means of a steam propelled locomotive, a booster motor to aid the main driving means in starting the locomotive and propelling the same at low speeds, a device for controlling the operative engagement of the booster motor with the locomotive, a device for controlling the application of motive power to the booster motor, said last named device being actuated and its operation completed, when the booster motor is to be put out of action before the first named device is actuated.

24. In combination with the main driving means of a steam propelled locomotive and its reverse lever, a steam operated booster motor to aid the main driving means in starting the locomotive and propelling it at low speeds, a fluid pressure device for governing the admission of steam to the booster, a fluid pressure device for operatively connecting the booster with and for disconnecting it from the locomotive, and controlling means for said fluid pressure devices actuated by movements of said reverse lever and adapted to control the application of pressure to said fluid pressure devices so that in putting the booster motor in operation it is first completely connected to the locomotive and thereafter supplied with steam and in putting the booster motor out of action steam is first cut off therefrom and thereafter the motor disconnected from the locomotive.

25. In combination with the main driving means of a steam propelled locomotive and its throttle valve and reverse lever, a booster motor to aid the main driving means in starting the locomotive and propelling it at low speeds, a fluid pressure device for governing the admission of steam to the booster, a fluid pressure device for operatively connecting the booster motor with and disconnecting it from the locomotive, controlling means for said fluid pressure devices actuated by movements of the reverse lever and adapted to control the supply of pressure to the fluid pressure devices so that in putting the booster motor in action the motor is first fully connected to the locomotive and thereafter steam admitted thereto and in putting the same out of action steam is first cut off from the motor and the motor thereafter disconnected from the locomotive, and a device actuated by steam pressure from the locomotive boiler when the throttle of the main driving means is open upon the actuation of which the admission of steam to the booster motor is dependent.

26. In combination with the main driving means of a steam propelled locomotive and its reverse lever and throttle valve, a steam operated booster motor to aid the main driving means in starting the locomotive and propelling the same at low speeds, a compressed air device for operatively connecting the booster motor with and disconnecting it from the locomotive, a throttle valve for the booster motor, compressed air devices for controlling the operation of the aforesaid mechanism and throttle valve, a steam actuated device, which receives steam when the throttle of the main driving means is open, the actuation of which conditions the opening of the booster motor throttle, a valve operated by the reverse lever for governing the admission of air pressure to said compressed air devices, and additional means for governing the admission of air pressure to said devices whereby, when the booster is put into action, it is first fully engaged with the locomotive and thereafter steam supplied thereto, and when it is put out of action steam is first cut off therefrom and the motor thereafter disconnected from the locomotive.

27. In combination with the main driving means of a steam propelled locomotive and its reverse lever and throttle valve, a steam operated booster motor to aid the main driving means in starting the locomotive and propelling the same at low speeds, mechanism for operatively connecting the booster motor with and disconnecting it from the locomotive, a source of supply of compressed air, a cylinder and spring pressed piston for controlling said mechanism, a cylinder and spring pressed piston for controlling the booster motor throttle, a valve opened and closed by the movements of the reverse lever, a pilot valve operated by said second named piston which in one position admits air, through the valve controlled by the reverse lever, to the cylinder of the first named piston, and in another position admits air to said cylinder, by-passing the valve controlled by the reverse lever, means for admitting compressed air from the first named cylinder into the second named cylinder after the piston in the first named cylinder has completed its stroke under pressure of air, said means comprising two valves, a steam actuated device adapted to receive steam when the throttle of the main driving means is open for controlling one of said valves, the other of said valves being moved in one direction by air pressure passing through the valve controlled by the reverse lever, and in the other direction by the air passing from the first mentioned cylinder to the second mentioned cylinder.

28. In combination with the main driving means of a locomotive, a booster motor, means for entraining the booster motor with the locomotive comprising a cylinder and a piston, one of which elements is moved by fluid pressure, and fluid pressure actuated mechanism for setting the booster motor in operation connected with said entraining means so that it receives fluid pressure therefrom but only after the movable element of the entraining means has substantially completed its entraining stroke.

29. In combination with the main driving means of a locomotive, a booster motor, means for entraining the booster motor with the locomotive comprising a cylinder and a piston, one of which elements is moved by fluid pressure, a fluid pressure operated device for setting said booster motor in operation, a fluid pressure supply pipe leading to said entraining means to introduce fluid pressure to the same, and a pipe leading from the same to the device for setting the booster in operation, which is uncovered to receive pressure fluid when the movable element of the entraining means has been moved by said fluid pressure to the end of its travel.

30. In combination with the main driving means of a locomotive and its reverse lever, a booster motor, means for entraining the booster motor with the locomotive comprising a cylinder and a piston, one of which elements is moved by fluid pressure, a fluid pressure operated device for setting said booster motor in operation, a fluid pressure supply pipe leading to said entraining means to introduce fluid pressure to the same, a pipe leading from the same to the device for setting the booster in operation which is uncovered to receive pressure fluid when the movable element of the entraining means has been moved by said fluid pressure to the end of its travel, and a valve to block the flow of pressure fluid through the first named pipe which is opened when the reverse lever is put into an extreme position.

31. In combination with the main driving means of a locomotive and its reverse lever, a booster motor, means for entraining the booster motor with the locomotive comprising a cylinder and a piston, one of which elements is moved by fluid pressure, a fluid pressure operated device for setting said booster motor in operation, a fluid pressure supply pipe leading to said entraining means to introduce fluid pressure to the same, a pipe leading from the same to the device for setting the booster in operation which is uncovered to receive pressure fluid when the movable element of the entraining means has been moved by said fluid pressure to the end of its travel, a valve to block the flow of pressure fluid through the first named pipe which is opened when the reverse lever is put into an extreme position, a valve to block the flow of pressure fluid through the second named pipe, and means actuated when the main driving means is set in operation for opening said last named valve.

32. In combination with the main driving means of a steam propelled locomotive and its throttle valve and reverse lever, a booster motor for aiding the main driving means in starting the locomotive and propelling it at low speeds, and controlling mechanism for the booster which operates when the reverse lever is in starting position and the main throttle valve open, to first entrain the booster with the locomotive and thereafter set the same in operation, and which operates, when either the throttle valve is closed or the reverse lever moved from starting position, to put the booster out of operation.

33. In combination with the main driving means of a steam propelled locomotive and its throttle valve and reverse lever, a booster motor for aiding the main driving means in starting the locomotive and propelling it at low speeds, and controlling mechanism for the booster which operates when the reverse lever is in starting position and the main throttle valve open, to first entrain the booster with the locomotive and thereafter set the same in operation, and which operates, when either throttle valve is closed or the reverse lever moved from starting position, to put the booster out of operation and when the reverse lever is so moved to thereafter disentrain the booster from the locomotive.

34. In combination with the main driving means of a steam propelled locomotive and its reverse lever and throttle valve, a booster motor for aiding the main driving means in starting the locomotive and propelling the same at low speeds, a fluid pressure actuated device for entraining the booster motor with the locomotive, a fluid pressure actuated device for controlling the operation of the booster, said devices arranged to be actuated in sequence to entrain the booster and then set the same in operation and to put the booster out of operation and then disentrain the same, a valve operated by the reverse lever for shutting off pressure fluid to both said devices, and a valve controlled through the movements of said throttle valve for shutting off pressure fluid only to the device controlling the operation of the booster.

35. In combination with the main driving means of a steam propelled locomotive and a booster motor to aid the main driving means in starting the locomotive and propelling the same at low speeds, means conditioned on the main driving means being in operation for first entraining the booster motor with the locomotive and then setting the same in operation, and means whereby the booster is put out of operation but not disentrained from the locomotive when steam is shut off from the main driving means.

36. In combination with the main driving means of a steam propelled locomotive and its reverse lever and throttle valve, a booster motor to aid the main driving means in starting the locomotive and propelling the same at low speeds, and mechanism which operates: to first entrain the booster motor with the locomotive and then set the same in operation when the reverse lever is in starting position and the throttle valve open; to first put the booster motor out of operation and then disentrain the same when the reverse lever is moved from such position; and to put the booster motor out of operation without disentraining the same when said throttle valve is closed without changing the position of the reverse lever.

In testimony whereof I hereunto affix my signature this 31st day of May, 1919.

HOWARD L. INGERSOLL.